W. M. SCOTT.
HEN'S NEST.
APPLICATION FILED OCT. 3, 1918.

1,329,024.

Patented Jan. 27, 1920.

Witness
J. C. Tomlin

Inventor,
W. M. Scott
By C. A. Snow & Co.
Attorneys.

UNITED STATES PATENT OFFICE.

WILLIAM M. SCOTT, OF SULLIVAN, ILLINOIS.

HEN'S NEST.

1,329,024.  Specification of Letters Patent.  Patented Jan. 27, 1920.

Application filed October 3, 1918. Serial No. 256,693.

*To all whom it may concern:*

Be it known that I, WILLIAM M. SCOTT, a citizen of the United States, residing at Sullivan, in the county of Moultrie and State of Illinois, have invented a new and useful Hen's Nest, of which the following is a specification.

The device forming the subject matter of this application is a hen's nest, and the invention aims to provide a nest which will shield the eggs, as soon as they are laid, thereby avoiding a breakage of the eggs, due to the tramping of the hen or otherwise, the construction being such that the nest may be taken apart readily for cleaning.

The invention aims to provide a nest so constructed that a brooding hen cannot sit upon eggs not intended for hatching, and addle them. Another object is to provide means whereby a hen may be kept out of the straw during laying, thereby preventing the hen from becoming a host for mites, lice and other vermin.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed; changes in the precise embodiment of the invention shown can be made without departing from the spirit of the invention.

In the accompanying drawings:—

Figure 1:
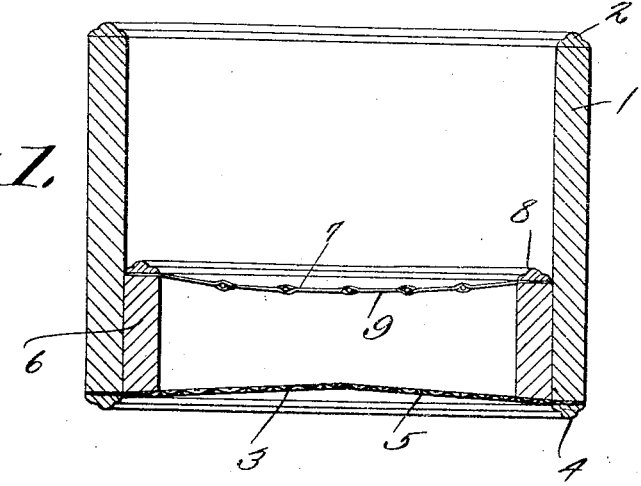
Figure 2:
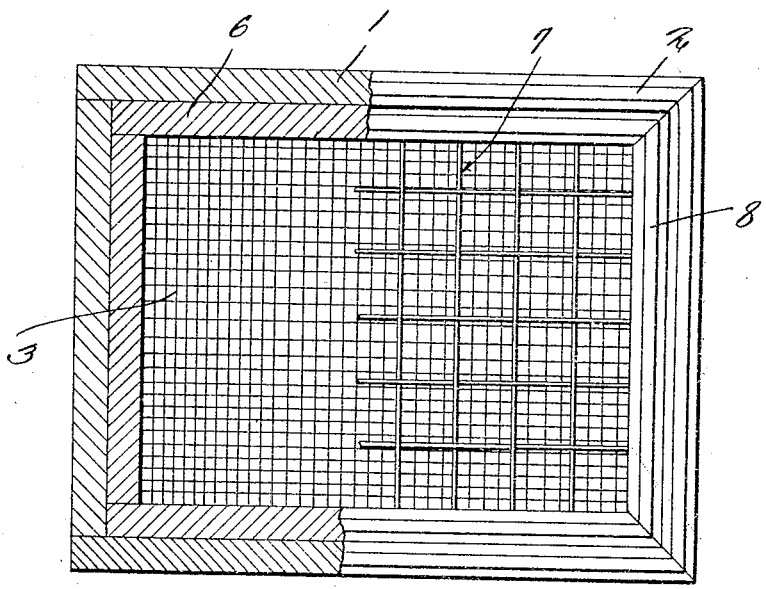

Figure 1 shows in transverse section, a hen's nest as constructed in accordance with the present invention; and Fig. 2 is a top plan wherein parts are broken away.

In carrying out the invention, there is provided a box like frame 1 supplied at its top with a trimming bead 2 and including a bottom 3 held in place by a strip 4. The bottom 3 is preferably made of fine mesh wire, although any other desired material may be employed. The bottom 3 slants upwardly toward its center, as indicated at 5.

The invention comprises a box like auxiliary frame 6, fitting closely but slidably in the main frame 1 and carrying a top 7 held in place by a strip 8. The top 7 may be rounded downwardly, as shown at 9, so as to provide a comfortable seat for the laying hen. The top 7 is preferably made of wire netting, the mesh of which is large enough to permit an egg to pass therethrough.

In practical operation, when the eggs are laid, they will pass through the top 7 and be deposited on the bottom 3. Because the bottom 3 slants laterally as shown at 5, the eggs will roll laterally against the auxiliary frame 6, and will be out of the way of eggs which are laid later. Subsequently, when an egg drops downwardly upon the bottom 3, the said egg will not break an egg which has been laid previously. Further, since the eggs are housed beneath the top 7, the hen cannot tread upon the eggs, thereby soiling or otherwise breaking them. The frame 6 may be removed at any time to permit a gathering of the eggs.

Having thus described the invention, what is claimed is:—

A hen's nest comprising a box-like main frame closed at the sides and open at the top; a foraminous bottom coöperating with the lower edge of the main frame and inclined laterally toward the main frame; a box-like auxiliary frame insertible into the top of the main frame and supported on the bottom, the auxiliary frame being closed at the sides and open at its lower end, the auxiliary frame fitting closely but slidably in the main frame and being of the same cross section from end to end, both externally and internally; a top carried by the upper edge of the auxiliary frame, the top being foraminous and comprising meshes of sufficient size to permit an egg to pass therethrough; and a strip secured to the lower edge of the main frame, the strip constituting a retainer for the bottom, enabling the bottom to withstand the weight of the auxiliary frame, the strip serving to space the bottom from the support whereon the nest is mounted, thereby to define an air chamber beneath the bottom.

In testimony that I claim the foregoing as my own, I have hereto affixed my signature in the presence of two witnesses.

WILLIAM M. SCOTT.

Witnesses:
 ELSIE MYERS,
 SAM NEWBOULD.